United States Patent
Odaohhara et al.

(10) Patent No.: US 8,675,891 B2
(45) Date of Patent: Mar. 18, 2014

(54) POWER SUPPLY UNIT WITH NOISE REDUCTION CAPABILITY

(75) Inventors: Shigefumi Odaohhara, Yamato (JP); Norihiro Urakawa, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1181 days.

(21) Appl. No.: 12/604,765

(22) Filed: Oct. 23, 2009

(65) Prior Publication Data

US 2010/0102642 A1  Apr. 29, 2010

(51) Int. Cl.
| | | |
|---|---|---|
| H04B 15/00 | (2006.01) | |
| H04R 29/00 | (2006.01) | |
| H04R 3/00 | (2006.01) | |
| H02B 1/00 | (2006.01) | |
| G05F 1/00 | (2006.01) | |
| H02M 3/156 | (2006.01) | |
| G06F 17/00 | (2006.01) | |

(52) U.S. Cl.
USPC ............ 381/94.1; 381/56; 381/122; 381/123; 323/282; 323/351; 700/94

(58) Field of Classification Search
USPC .......... 381/94.1–94.9, 123, 56, 122; 307/125; 323/222, 282, 351; 700/94
See application file for complete search history.

(56) References Cited

U.S. PATENT DOCUMENTS

| | | | | |
|---|---|---|---|---|
| 4,435,751 A | * | 3/1984 | Hori et al. ...................... | 700/280 |
| 7,652,461 B2 | * | 1/2010 | Tateishi ......................... | 323/284 |
| 8,279,628 B2 | * | 10/2012 | Melanson ....................... | 363/17 |
| 2004/0267990 A1 | * | 12/2004 | Lin ................................. | 710/100 |
| 2005/0212502 A1 | * | 9/2005 | Casey et al. ................... | 323/284 |
| 2008/0278975 A1 | * | 11/2008 | Degen et al. ................. | 363/21.18 |

FOREIGN PATENT DOCUMENTS

| | | |
|---|---|---|
| JP | 2002058239 | 2/2002 |
| JP | 2002095251 | 3/2002 |
| JP | 2006-333572 | 7/2006 |

OTHER PUBLICATIONS

Hirochika, Shimonagayoshi, "Vehicle Power Converter and Carrier Frequency Controlling Method", Jul. 12, 2006, JP 2006-333572, Machine Translation by JPO, pp. 1-6.*

* cited by examiner

*Primary Examiner* — Davetta W Goins
*Assistant Examiner* — Daniel Sellers
(74) *Attorney, Agent, or Firm* — Ference & Associates LLC

(57) ABSTRACT

Embodiments of the present invention provide a power supply unit capable of achieving noise reduction while maintaining efficiency under the light load state. A FET driver controls switching elements in either one of a Pulse Width Modulation (PWM) mode, an intermittent mode having a lower operating frequency than that in the PWM mode, and a noise-free mode having a higher operating frequency than an audible frequency range. The FET driver operates first in the intermittent mode under the light load state. A microphone collects noise generated from the surroundings of a power supply unit. When the level of an audio signal collected by the microphone exceeds a predetermined level, the FET driver transitions from the intermittent mode to the noise-free mode. In accordance with such an embodiment, the FET driver operates in the noise-free mode only when noise is actually generated.

20 Claims, 5 Drawing Sheets

(A)

(B)

(C)

(D)

(E)

POWER SUPPLY UNIT WITH NOISE REDUCTION CAPABILITY

CLAIM FOR PRIORITY

This application claims priority from Japanese Patent Application No 2008-274441, filed on Oct. 24, 2008, and which is fully incorporated by reference as if set forth herein.

FIELD OF THE INVENTION

The embodiments of the invention described herein generally relate to a technique for achieving both improved efficiency and noise reduction under the light load state in a power supply unit equipped with a switching element.

BACKGROUND OF THE INVENTION

In a notebook computer (hereinafter, referred to as a laptop PC), a DC voltage output from an AC/DC adapter is converted into a predetermined DC voltage by a DC/DC converter. The laptop PC is equipped with a battery charger for charging a rechargeable battery. The AC/DC adapter, the DC/DC converter, and the battery charger are also referred to as a switching regulator because they are equipped with a switching element capable of regulating an input DC voltage to output a predetermined DC voltage.

The switching regulator is configured to control either one of ON period and OFF period of one cycle period of the switching element in an operation mode such as, for example, a PWM (Pulse Width Modulation) mode and a PFM (Pulse Frequency Modulation) mode to output a constant DC voltage. Specifically, in the PWM mode, the ON periods are controlled while maintaining the switching frequency (hereinafter, referred to as an operating frequency) which corresponds to the frequency of turning ON/OFF the switching element constant, whereas in the PFM mode, the OFF periods are controlled by maintaining the ON periods constant, thereby controlling the average secondary-side voltage at a predetermined range. The PWM mode is used in many switching regulators because its constant operating frequency allows an easy noise-reduction filter design; it however has drawbacks in that its switching loss under light load state is large.

An operation mode called an intermittent mode is employed in order to compensate for the drawbacks of the PWM mode under a light load state. The intermittent mode is also referred to as a skip mode, a burst mode, or a sleep mode, for example. A switching regulator employing the intermittent mode monitors a load current or a load voltage and based on the monitored load state, operates in a PWM mode under a heavy load state or in an intermittent mode under a light load state. In the intermittent mode, the switching loss can be reduced by lowering the operating frequency from that in the PWM mode.

In the intermittent mode, the operating frequency is lowered as the load decreases, and a constant output voltage can be generated even until a no-load state. In this case, when the load decreases, the operating frequency of the switching element becomes lower than 20 kHz, which is the upper limit of an audible frequency. Under the no-load state, a very small current, which is determined by the circuit constants of capacitors or resistors contained in the power supply unit, will flow through the switching element, and the operating frequency will decrease to about 10 Hz. Therefore, under the light load state, inductors and capacitors constituting the switching regulator may vibrate at the audible frequency and thus generate noise. The causes of the noise generation are related to the physical arrangement, mounting method, and securing force of constituent elements of the switching regulator with respect to a board. Moreover, the causes are also related to the individual difference such as materials or capacity of the elements and the ambient temperature. Furthermore, since the noise generates due to a complexity of the causes and moreover the elements deteriorate over time, it is practically difficult to perfectly control the noise and even guarantee such a noise-controlled state for a long period of time.

Japanese Patent Application Laid-Open No. 2006-333572 describes a technique that detects noise in a vehicle to control a carrier frequency of a PWM-controlled converter. In the invention described in the above document, the noise within the vehicle is detected based on the wind sound or road noise generating accompanied with the driving of the car. Based on the detection result, the carrier frequency is lowered so as to improve the power conversion efficiency, for example, during high-speed driving where the detected noise level increases enough to kill the noisy sound resulting from the carrier frequency of the PWM-controlled converter. On the other hand, for example, during low-speed driving where the detected noise level decreases and hence the noisy sound resulting from the carrier frequency becomes relatively high, the carriage frequency of a switching portion is increased so as to suppress the noisy sound.

Japanese Patent Application Laid-Open No. 2002-095251 describes a switching regulator employing such an ON/OFF control that regulates the current limit of the switching regulator so as to reduce audible noise under the light load state. The switching regulator according to the invention described in the above document includes a state machine that regulates the current limit of the switching regulator based on the patterns of the feedback signal values supplied from the output of a power supply with respect to N cycles of preceding driving signals. The state machine regulates to further lower the current limit under the light load state so that the cycles are not skipped in order to reduce the operating frequency of the switching regulator to be within an audible frequency range until the density of the magnetic flux passing through a transformer becomes sufficiently small and generation of the audible noise is suppressed.

Japanese Patent Application Laid-Open No. 2002-058239 describes a switching regulator that is equipped with an auto-skip circuit capable of detecting whether the present load state corresponds to a light load state or a heavy load state. The switching regulator is configured to operate in a PWM mode under the heavy load state and, under the light load state, operate in a skip mode where the switching frequency of a main output transistor becomes lower; however, the switching regulator does not transition to the skip mode until the light load state continues for a predetermined period of time even when the load state has changed from the heavy load state to the light load state.

SUMMARY OF THE INVENTION

Embodiments of the present invention broadly contemplate a power supply unit capable of achieving noise reduction without decreasing efficiency under the light load state. Embodiments of the present invention provide a semiconductor chip realizing such a power supply unit. Embodiments of the present invention also provide a method for controlling a switching element of such a power supply unit. Embodiments of the present invention also provide a power consuming apparatus incorporating such a power supply unit.

In summary, one aspect of the invention provides an apparatus comprising:
a switching element configured to perform a switching operation between power modes; a microphone configured to collect noise to output an audio signal; an audio circuit configured to output a switching signal when the level of the audio signal exceeds a predetermined value; and a control circuit configured to, responsive to receiving the switching signal, control the switching element in one of a Pulse Width Modulation mode, an intermittent mode, and a noise-free mode; wherein the control circuit transitions to the noise-free mode in response to the switching signal received during operation in the intermittent mode.

Furthermore, an additional aspect of the invention provides a method comprising: receiving an audio signal; receiving a load current signal; receiving a time-up signal; and switching an electronic device to one of a plurality of power modes via a switching element responsive to one or more of the load current signal, the time-up signal, and the audio signal; said plurality of power modes comprising: a Pulse Width Modulation mode, an intermittent mode, and a noise-free mode.

Moreover, another aspect of the invention provides a computer program product comprising: a program of instructions tangibly embodied on a program to storage device, the program of instructions comprising: computer readable program code configured to: receive an audio signal; receive a load current signal; receive a time-up signal; and switch an electronic device to one of a plurality of power modes responsive to one or more of the load current signal, the time-up signal, and the audio signal; said plurality of power modes comprising: a Pulse Width Modulation mode, an intermittent mode, and a noise-free mode.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION OF THE INVENTION

Figure 1:
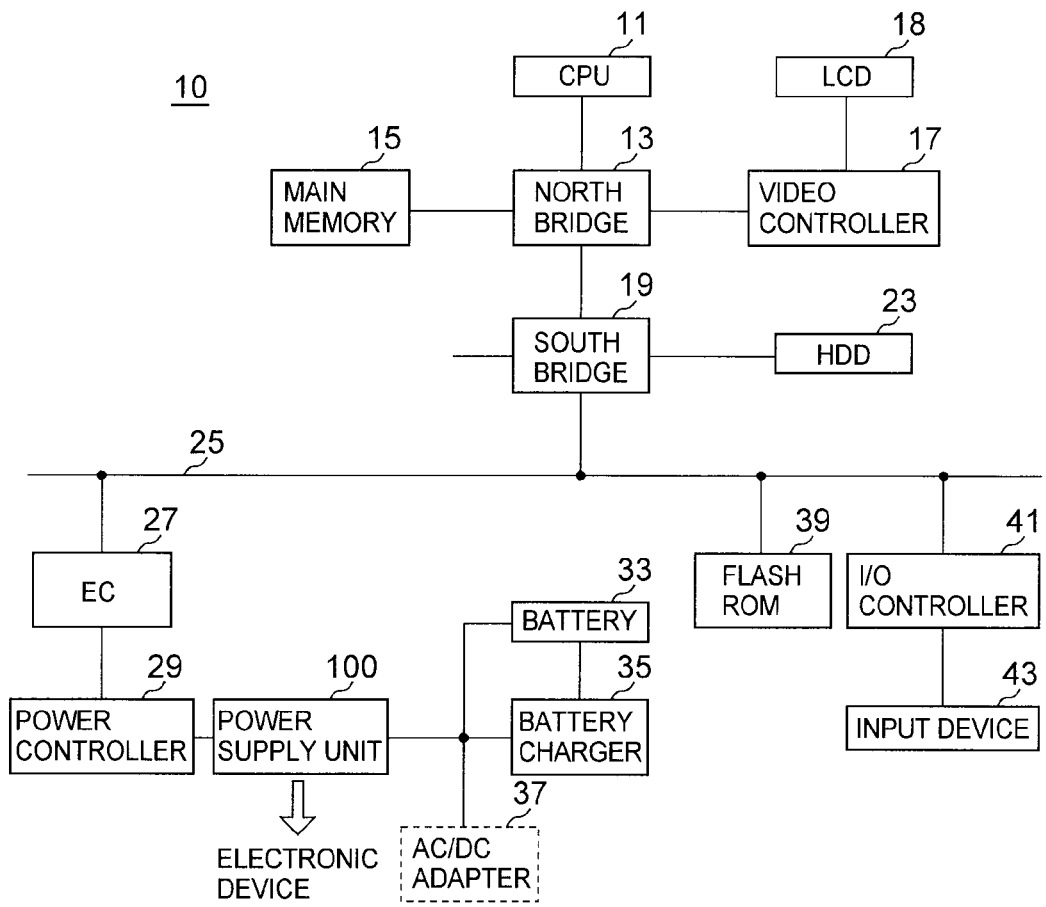
FIG. 1 is a schematic block diagram illustrating the configuration of a laptop PC according to an embodiment of the invention.

It will be readily understood that the aspects of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

According to the noise test results conducted, during manufacture, on a plurality of laptop PCs of the same model incorporating noise reduction measures, noise levels higher than a reference level are sometimes observed in several laptop PCs. In such a case, it is necessary to redo the noise reduction measures of the entire laptop PCs of that model, and as a method for eliminating such necessity, a method of employing a noise-free mode in lieu of an intermittent mode is used. The noise-free mode is an operation mode where the operating frequency is controlled so as not to be lower than 20 kHz even the load becomes much smaller in the intermittent mode, and hence, noise is not generated.

The noise-free mode does not generate noise but its efficiency under the light load state is lower than that in the intermittent mode. If the entire laptop PCs of the same model are always controlled to operate in the noise-free mode when the noise test results show there is even one laptop PC generating noise higher than the reference level, the efficiency under the light load state will decrease and hence, this is not desirable. This is particularly so when a laptop PC is left in a suspended state for several days in a state of being powered by a battery because the battery capacity will become empty. Moreover, since noise generates when a certain condition is satisfied and will be generated or disappear due to factors which vary over time, operation in only the noise-free mode under the light load state without employing the intermittent mode will result in a decrease in efficiency more than needed and hence, this is not desirable.

At least one presently preferred embodiment of the invention provides a power supply unit capable of achieving noise reduction without decreasing efficiency under the light load state. Embodiments of the invention also provide a semiconductor chip realizing such a power supply unit. In another preferred embodiment of the invention, a method for controlling a switching element of such a power supply unit is provided. Another embodiment of the invention also a method for controlling a switching element of such a power supply unit. In yet another embodiment of the invention, provide a power consuming apparatus incorporating such a power supply unit is provided.

A power supply unit according to an aspect of the present invention is configured to include a switching element performing a switching operation; a microphone configured to collect noise to output an audio signal; and a control circuit for controlling the switching element. The control circuit is capable of controlling the switching element in a first operation mode where it operates within an operating frequency range including an audible frequency or a second operation mode where it operates at an operating frequency higher than the audible frequency. Moreover, the power supply unit is also operable in a third operation mode having an operating frequency higher than that in the first operation mode. The first operation mode corresponds to an intermittent mode, and the second operation mode and the third operation mode correspond to a noise-free mode and a PWM mode, respectively. The first operation mode and the second operation mode are able to provide higher efficiency under the light load state than that in the third operation mode. However, since the operating frequency in the second operation mode is maintained higher than the audible frequency, the switching loss in the second operation mode is larger than that in the first operation mode when the power consumption of a load is extremely small.

Aspects of the present invention are based on the phenomenon that noise will not generate when the operating frequency under the light load state in the first operation mode is set to the audible frequency, and according to embodiments of the present invention, the second operation mode is used only when noise is actually generated so that the first operation mode which provides good efficiency can be used as long as possible. For this purpose, the control circuit transitions first to the first operation mode, rather than to the second operation mode, when the power consumption of a load becomes lower than a predetermined value during its operation in the third operation mode. Moreover, the control circuit transitions from the first operation mode to the second operation mode only when the level of the audio signal output from the microphone exceeds a predetermined value.

Since there is a possibility that noise disappears during its operation in the second operation mode, it is not desirable to continue using the second mode which provides poorer efficiency than the first operation mode for a long period of time. In an embodiment of the present invention, the control circuit periodically checks the level of the audio signal in response to a time-up signal from a timer circuit and transitions from the second operation mode to the first operation mode when the level of the audio signal becomes lower than the predetermined value. In cases where an embodiment of the present invention is not employed, it is necessary for the control circuit to always operate in the second operation mode under the light load state in order to prevent the generation of noise. On the contrary, according to embodiments of the present invention, since the first operation mode is used as the initial operation mode whereas the second operation mode is used as an auxiliary operation mode, it is possible to provide a power supply unit achieving both the noise reduction under the light load state and efficiency maintenance.

The power supply unit according to embodiments of the present invention can be applied to an overall power consuming apparatus requiring quietness. The power supply unit is particularly effective for a portable computer in which its operating time under the light load state such as the suspended state or other power-saving mode state becomes longer, and in the meantime, electrical power is supplied by a battery. Moreover, the power supply unit of at least one embodiment of the present invention can be effectively applied to a power supply unit exclusively for processors because processors remain in the light load state during their idle time.

In accordance with aspects of the present invention a power supply unit capable of achieving noise reduction without decreasing efficiency under the light load state is provided. Moreover, further aspects of the present invention provide a semiconductor chip realizing such a power supply unit. Furthermore, aspects of the invention also provide a method for controlling a switching element of such a power supply unit. In addition, aspects of the present invention provide a power consuming apparatus incorporating such a power supply unit.

Configuration of Laptop PC

FIG. 1 is a schematic block diagram illustrating the configuration of a laptop PC 10 according to an embodiment of the present invention. A CPU 11 is an arithmetic processing device performing the central function of the laptop PC 10 and executes an operating system (OS), a BIOS, a device driver, or application programs. The CPU 11 controls a north bridge 13 and various devices connected to the north bridge 13 via various buses. The north bridge 13 has a memory controller function for controlling an operation of accessing a main memory 15, a data buffer function for absorbing a difference in a data transfer rate between the CPU 11 and other device, and the like. The main memory 15 is a volatile RAM used as a read area of programs executed by the CPU 11 and as a work area to which processed data are written. A video controller 17 is connected to the north bridge 13, provided with a video chip and a VRAM, and configured to receive a drawing command from the CPU 11 to produce images of image files to be drawn and write the images in the VRAM and to deliver images read out of the VRAM to a liquid crystal display (LCD) 18 as an image data.

A south bridge 19 is connected to the north bridge 13, provided with ports for a USB (Universal Serial Bus), a serial ATA (AT Attachment), an SPI (Serial Peripheral Interface) bus, a PCI (Peripheral Component Interconnect) bus, a PCI-Express bus, an LPC (Low Pin Count), and the like, and connected to devices corresponding thereto. An HDD 23 is connected to the serial ATA port of the south bridge 19. In the HDD 23, an OS, a device driver, an application program, and the like are stored.

The south bridge 19 is also connected via a LPC bus 25 to legacy devices which have been used in the laptop PC 10 from the past or devices which do not require high-speed data transmission. The LPC bus 25 is connected to an embedded controller (EC) 27, a flash ROM 39, an I/O controller 41, and the like. The EC 27 is a microcomputer configured by an 8 to 16 bit CPU, a ROM, a RAM, and the like, and is further provided with an multi-channel A/D input terminal, a multi-channel D/A output terminal, a timer, and a digital input/output terminal.

The EC 27 is connected to a power controller 29. The power controller 29 is a semiconductor logic circuit for controlling the electrical power supplied to the devices mounted on the laptop PC 10. The power controller 29 is connected to a power supply unit 100 having the features of an embodiment of the present invention. The power supply unit 100 is a switching regulator that converts a DC voltage supplied from an AC/DC adapter 37 or a battery 33 into a plurality of DC voltages to supply electrical power to the devices mounted on the laptop PC 10. The power supply unit 100 is configured by a plurality of blocks divided according to voltages and purposes, in addition to a special block for supplying electrical power to only the CPU 11; the respective blocks perform independent switching operations. The AC/DC adapter 37 is connected to the laptop PC 10 and is configured to convert an AC voltage into a DC voltage to supply electrical power to a battery charger 35 for charging the power supply unit 100 and the battery 33.

The flash ROM 39 is a nonvolatile memory in which the stored contents are electrically rewritable, and which stores therein a device driver for controlling the I/O device, a system BIOS for managing power, temperature of a casing, or the like so as to comply with the ACPI (Advanced Configuration and Power Interface) specifications, a POST (Power-On Self Test) for performing tests or initialization of hardware components during activation of the laptop PC 10, and the like. The I/O controller 41 is connected to an input device 43 such as a keyboard or a mouse.

The laptop PC 10 has defined therein a plurality of power supply modes referred to as a suspended state or a hibernation state, in addition to a power-ON state. The suspended state corresponds to the ACPI S3 state and the hibernation state corresponds to the ACPI S4 state. The suspended state refers to a function capable of saving, in the main memory 15, the application or system states immediately before the operation of the laptop PC 10 is stopped so as to recover the saved state from the main memory 15 when the operation is continued later, thereby enabling the tasks to be resumed quickly. In this operation mode, electrical power is supplied to the minimal necessary devices such as, for example, the EC 27, the power controller 29, and the power supply unit 100, which are necessary for holding stored contents in the main memory 15 or, if they support wake on LAN function, executing the stored contents.

In the hibernation state, the application or system states immediately before the operation of the laptop PC 10 is stopped are stored in the HDD 23 and the supply of electrical power to most devices including the main memory 15 is stopped. In the hibernation state, the power consumption is decreased more than the suspended state. In the suspended state and the hibernation state, the load of the power supply unit 100 becomes extremely small. When the laptop PC 10 transitions from the power-on state to the suspended state, the operating system detects the action of a lid switch accompanied by opening/closing of a casing, a keyboard operation, or a lapse of a predetermined idle time detected by a timer and instructs an ACPI BIOS stored in the flash ROM 39 and then the ACPI BIOS controls the power controller 29 via the EC 27. The power controller 29 controls the power supply unit 100 so that electrical power is supplied to only the devices which are defined for the power supply mode.

In the suspended state or the hibernation state, since the laptop PC 10 does not operate for actual tasks, the power supply unit 100 is under the light load state, but in the case of a mobile use, it is carried to a destination place while being powered by the battery 33. Moreover, when a user begins to use it, the user may sometimes feel discomfort in its usable time because of the small remaining capacity of the battery. Therefore, there is a particular need in the laptop PC 10 for reduction in the loss of power consumption in the light load state as in the suspended state or the hibernation state.

Power Supply Unit and Decoupling Capacitor

Figure 2:
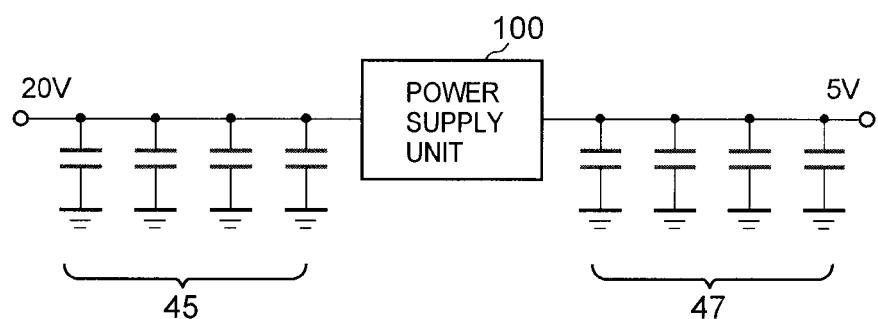
FIG. 2 is a diagram for describing a connection state between a power supply unit and decoupling capacitors according to an embodiment of the invention.

FIG. 2 is a diagram for describing a connection state between the power supply unit 100 and decoupling capacitors. The switching elements constituting the power supply unit 100 perform a switching operation in order to convert a voltage of DC 20 V supplied from the AC/DC adapter 37 to a voltage of DC 5 V, for example. From the secondary side of the power supply unit 100, electrical power is supplied directly, or via another power supply unit, to various devices mounted on the CPU 11, the LCD 18, and a main board. To the primary side of the power supply unit 100, a decoupling capacitor group 45 constructed by a plurality of laminated ceramic capacitors is connected. The decoupling capacitor is also referred to as a bypass capacitor and performs a function of decreasing a line impedance with respect to a high-frequency voltage to restricting movement of charges on the line accompanied with the switching operation of the power supply unit 100 to a local range.

Likewise, to the secondary side of the power supply unit 100, is connected a decoupling capacitor group 47 constructed by a plurality of laminated ceramic capacitors. The decoupling capacitor groups 45 and 47 are surface-mounted on a main board in the vicinity of the devices constituting the power supply unit 100. When the switching elements of the power supply unit 100 are performing switching operations at the audible frequency, a ripple voltage which occurs from the power supply unit 100 at cycles corresponding to the frequency is superposed on the base voltage of DC 20 V or 5 V. Therefore, a ripple current of audible frequency flows through the decoupling capacitor groups 45 and 47 to thus generate vibration, which is observed as noise from the surroundings of the decoupling capacitor groups 45 and 47.

The noise is mainly generated from the decoupling capacitors and the main board in which vibration is excited by the decoupling capacitors. Since the vibration varies with the arrangement of the decoupling capacitors and their positions on a circuit board, the securing position of the circuit board, the aging of devices, the ambient temperature, and the like, the vibration will be generated or not in identical laptop PCs used under the same environment. Moreover, the occurring state of the noise also varies along the time axis.

Configuration of Power Supply Unit

Figure 3:
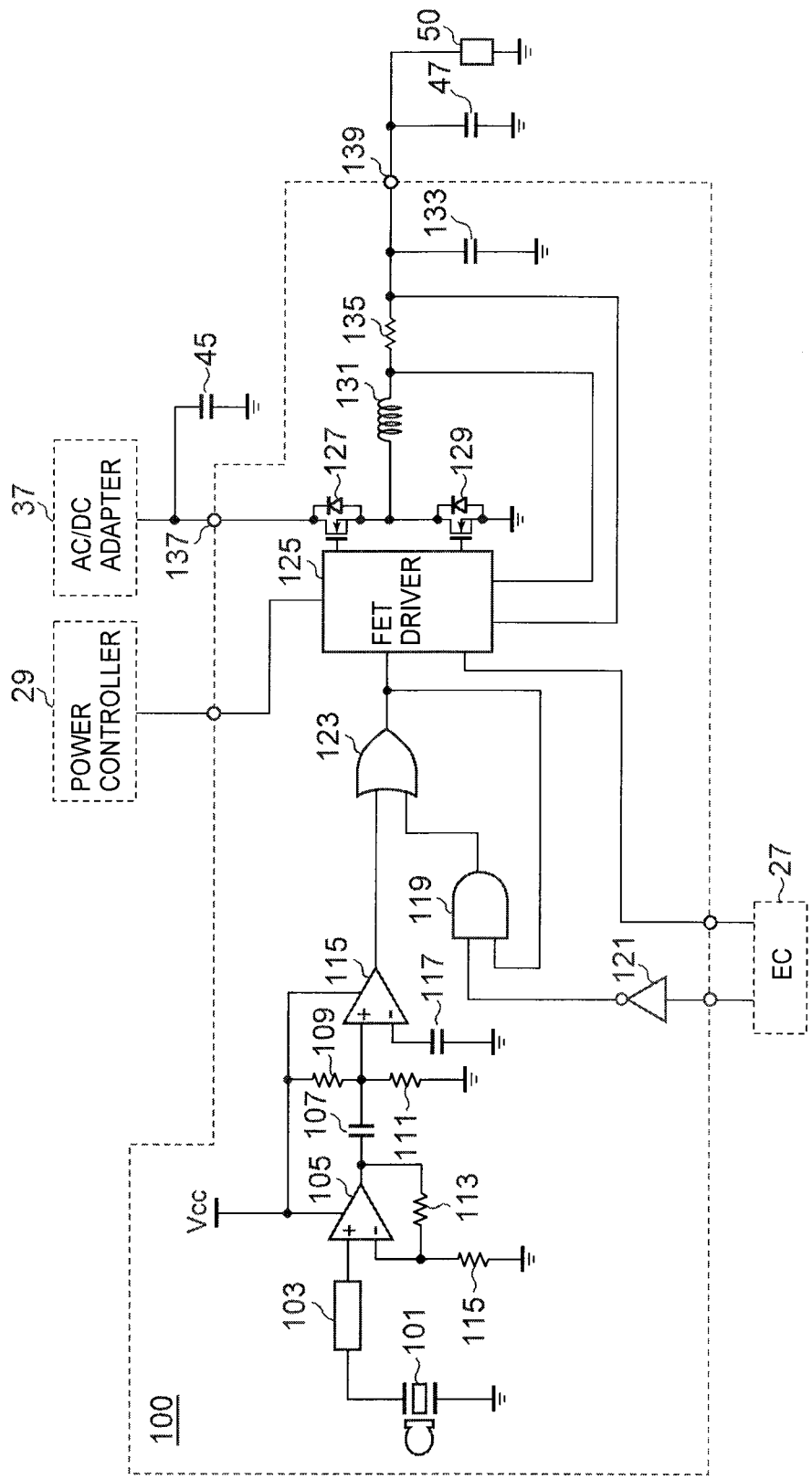
FIG. 3 is a block diagram illustrating the configuration of the power supply unit according to an embodiment of the invention.

FIG. 3 is a block diagram illustrating the configuration of one segment block of the power supply unit 100. The power supply unit 100 is a switching regulator exclusively for supplying electrical power to only the CPU 11, for example. Alternatively, the power supply unit 100 may be a switching regulator configured to supply electrical power to devices which operate in the suspended state. The power supply unit 100 is particularly effective for purposes where there are many chances of operating under the light load state in order to achieve noise reduction during the light load state and efficiency maintenance. The power supply unit 100 is formed by a plurality of devices mounted on the main board of the laptop PC 10. The respective devices of the power supply unit 100 are powered by the AC/DC adapter 37 or the battery 33 (see FIG. 1).

A silicon microphone 101 converts a change in electrostatic capacitance between a vibrating membrane and a back electrode thereof into a change in electrical voltage to output an audio signal. The silicon microphone 101 is connected to a band-pass filter 103 that removes the audio signal having frequency out of the audible frequency range. The band-pass filter 103 is configured by a resistor and a capacitor and allows only the audio signal mainly of audible frequency to pass therethrough. The band-pass filter 103 is connected to the non-inverting input of a non-inverting amplifier 105 that amplifies the audio signal. The output of the non-inverting amplifier 105 is divided by resistors 113 and 115 and connected to the inverting input of the non-inverting amplifier 105. The resistors 113 and 115 determine the gain of the non-inverting amplifier 105.

The output of the non-inverting amplifier 105 is further connected to one terminal of a capacitor 107 that removes the DC component from the amplified audio signal. The other terminal of the capacitor 107 is connected to the non-inverting input of a comparator 115. The non-inverting input of the comparator 115 is biased to constant voltage by voltage-dividing resistors 109 and 111 that divide the voltage Vcc. On the biased DC voltage, the audio signal output from the non-inverting amplifier 105 is superposed. The inverting input of the comparator 115 is connected to a reference voltage source 117. The reference voltage of the reference voltage source 117 is set so as to provide a reference to the level of the audio signal corresponding to an allowable noise level. In addition, a processing circuit may be provided to the output of the non-inverting amplifier 105, for applying various processing to output a signal capable of representing the noise discomfort sensed by the human and matching the hearing capability of a human.

The comparator 115 is configured to output a High signal to one input of an OR gate 123 when the level of the audio signal exceeds the reference voltage. The other input of the OR gate 123 is connected to the output of an AND gate 119. One input of the AND gate 119 is connected to the output of an inverter 121, and the input of the inverter 121 is connected to the EC 27. The inverter 121 is configured to output a Low signal to the AND gate 119 when a time-up signal is received from the EC 27. The other input of the AND gate 119 is connected to the output of the OR gate 123.

Therefore, when the High signal is output from the comparator 115 so the OR gate 123 is outputting the High signal, the OR gate 123 will continue outputting the High signal unless the time-up signal is output from the EC 27, even when the level of the audio signal decreases so the comparator 115 is outputting the Low signal. The output of the OR gate 123 is connected to the switch terminal of an FET driver 125, the terminal for switching from the intermittent mode to the noise-free mode. The description of the operation of the FET driver 125 will be provided later. The FET driver 125 is connected to the power controller 29 for controlling the operation of the power supply unit 100. The FET driver 125 is connected to the EC 27 and is configured to send a Set signal and a Reset signal to the timer of the EC 27.

The FET driver 125 is connected to a gate circuit constructed by a main transistor 127 and an auxiliary transistor 129 whose switching operations are controlled by the synchronous rectification method. The main transistor 127 and the auxiliary transistor 129 are configured by MOSFETs. The auxiliary transistor 129 is used in lieu of the conventional flywheel diode that passes a feedback current therethrough; moreover, because it uses the MOSFET having a low On resistance, it is possible to realize a highly efficient power supply unit. However, the embodiments of the present invention are not limited to the synchronous rectification power supply unit. The drain of the main transistor 127 is connected to the AC/DC adapter 37 via an input terminal 137 of the power supply unit 100.

The input terminal 137 is connected to the coupling capacitor group 45 which is the vibration source serving as the main cause of noise. The source of the main transistor 127 is connected to the drain of the auxiliary transistor 129, and the source of the auxiliary transistor 129 is connected to the ground. The source of the main transistor 127 is connected to one terminal of an inductor 131, and the other terminal of the inductor 131 is connected to one terminal of a sense resistor 135 that measures the current flowing through the inductor 131. The other terminal of the sense resistor 135 is connected to an output terminal 139 of the power supply unit 100. A smoothing capacitor 133 is connected between the other terminal of the sense resistor 135 and the ground. Both ends of the sense resistor 135 are connected to the FET driver 125.

The output terminal 139 is connected to the coupling capacitor group 47 and a load 50 of the power supply unit 100.

The silicon microphone 101, the band-pass filter 103, the non-inverting amplifier 105 and its peripheral elements, the comparator 115 and its peripheral elements, the OR gate 123, the AND gate 119, and the inverter 121 constitute an audio circuit that outputs a switching signal when noise becomes equal to or higher than a predetermined level. Although the audio circuit is configured by individual elements in FIG. 3, these elements may be incorporated into a semiconductor chip to be integral with the FET driver 125. Moreover, the timer circuit incorporated in the EC 27 for measuring the time elapsed in the noise-free mode may be incorporated into the semiconductor chip. Since the semiconductor chip having such a configuration operates if only power and a reference pulse signal are supplied thereto, it is possible to construct the power supply unit with ease.

FET Driver

The description of the operation of the FET driver 125 will be provided subsequently. The FET driver 125 is a well-known semiconductor chip which is connected to the other terminal of the sense resistor 135 and contains various circuits such as, for example, a voltage detection circuit, a triangular wave generation circuit, an error amplifier, a comparator, an intermittent operation circuit, and a noise-free operation circuit. The intermittent operation circuit operates the FET driver 125 in an intermittent mode, and the noise-free operation circuit operates the FET driver 125 in a noise-free mode. The FET driver 125 is configured as a current-controlled switching regulator. The FET driver 125 operates in either one of a PWM mode, an intermittent mode, and a noise-free mode. When the switching signal is supplied to the switch terminal of the OR gate 123 during its operation in the intermittent mode, the FET driver 125 transitions from the intermittent mode to the noise-free mode.

The FET driver 125 maintains the intermittent mode when the OR gate 123 is outputting the Low signal to the switch terminal during its operation in the intermittent mode. The transition from the PWM mode to the intermittent mode or the noise-free mode is determined by the FET driver 125 based on the magnitude of the power consumption of a load. The FET driver 125 is initially set so that it transitions from the intermittent mode or the noise-free mode to the PWM mode when the power consumption of the load exceeds a predetermined value and transitions from the PWM mode to the intermittent mode when the power consumption of the load becomes lower than the predetermined value. Moreover, the FET driver 125 transitions from the intermittent mode to the noise-free mode only when the level of the audio signal becomes equal to or higher than a predetermined value.

Figure 4:
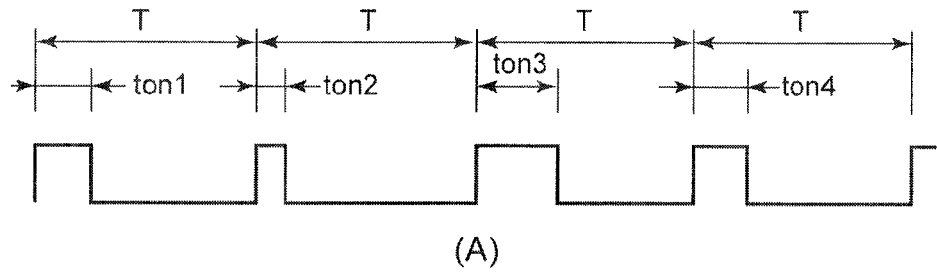
FIGS. 4(A) to 4(E) are diagrams for describing the switching cycle of a FET driver in a PWM mode, an intermittent mode, and a noise-free mode according to an embodiment of the invention.
Figure 4:
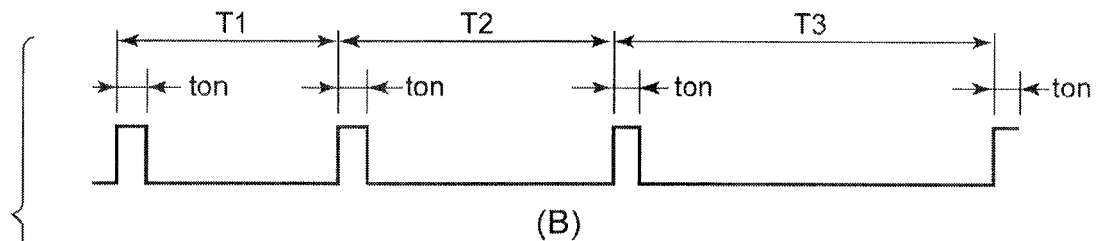
Figure 4:
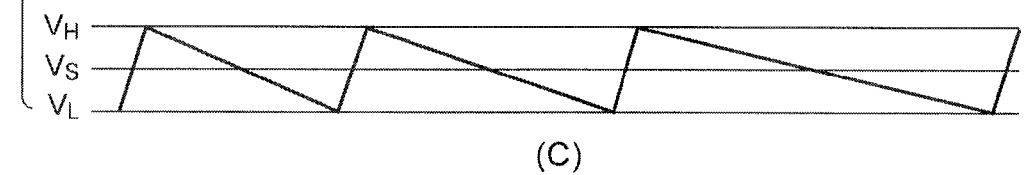
Figure 4:
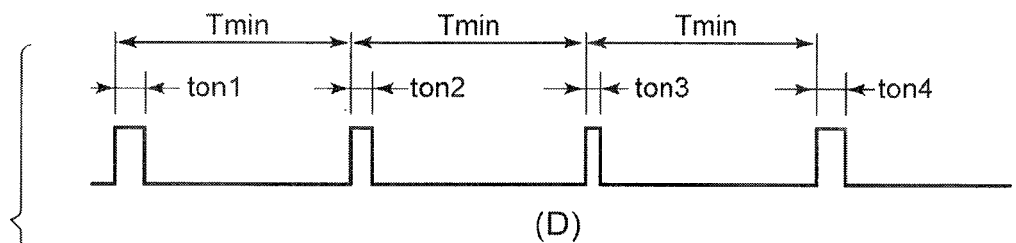
Figure 4:
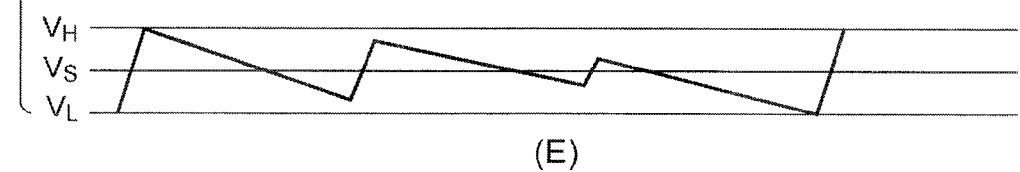

FIGS. 4(A) to 4(E) are diagrams illustrating the switching cycles in the PWM mode, the intermittent mode, and the noise-free mode. FIG. 4(A) illustrates the switching cycle in the PWM mode; FIGS. 4(B) and 4(C) illustrate the switching cycle and the output voltage in the intermittent mode, respectively; and FIGS. 4(D) and 4(E) illustrate the switching cycle and the output voltage in the noise-free mode, respectively. The FET driver 125 determines the magnitude of the load 50 from the open circuit voltage of the sense resistor 135 and operates in the PWM mode when the magnitude is equal to or higher than a predetermined value. In the PWM mode, the main transistor 127 and the auxiliary transistor 129 are controlled so that their On/Off states are reversed. During periods when the main transistor 127 is On and the auxiliary transistor 129 is Off (hereinafter, such periods will be referred to as ON periods), the current supplied from the AC/DC adapter 37 is supplied to the load 50 via the inductor 131 and the sense resistor 135; at the same time, the smoothing capacitor 133 is charged.

During periods when the main transistor 127 is Off and the auxiliary transistor 129 is On (hereinafter, such periods will be referred to as OFF periods), the magnetic field energy stored in the inductor 131 during the ON periods is discharged to allow a load current to flow through the load 50 and the auxiliary transistor 129. At this time, the charges stored in the smoothing capacitor 133 are also discharged to flow as the load current. As illustrated in FIG. 4(A), the FET driver 125 compares the output voltage of the output terminal 139 with a setting voltage to regulate only the ON periods (ton1 to ton4) while maintaining the operating frequency or the cycle T constant, thereby maintaining the output voltage at a predetermined range. As the operating frequency at this moment, a value is chosen which is sufficiently higher than the audible frequency of 400 kHz, for example.

In the PWM mode, since the operating frequency of the main transistor 127 is constant, the switching loss ratio under the light load state increases and hence the efficiency decreases. The intermittent mode is employed to improve the efficiency under the light load state. The intermittent mode is also referred to by various terms such as, for example, a burst mode, a skip mode, and a power-save mode. In the intermittent mode, the ON periods (ton) are maintained constant while ignoring several numbers of the control pulses during the PWM mode to control the cycles (T1 to T3) so that the output voltage falls within the range of the upper limit ($V_H$) and the lower limit ($V_L$), thereby maintaining the setting voltage ($V_s$). FIGS. 4(B) and 4(C) show the state where the load becomes smaller with as the time passes by and the cycle becomes longer in the order of T1, T2, and T3, so that the output voltage is maintained at the setting voltage $V_s$. The intermittent mode in an embodiment of the present invention includes all control methods satisfying the requirements that the operating frequency is lower than that in the PWM mode; the operating frequency decreases as the load becomes smaller, thereby regulating the output voltage; and the operating frequency falls within the audible frequency range.

The FET driver 125 performs the transition from the PWM mode to the intermittent mode when the value of the current flowing through the inductor 131 is determined to be lower than the predetermined value based on the measured open circuit voltage of the sense resistor 135. The FET driver 125 performs the transition from the intermittent mode to the PWM mode in the same way. Since the operating frequency in the intermittent mode decreases as the load becomes smaller, the efficiency under the light load state becomes good but the operating frequency falls within the audible frequency range. For example, the operating frequency in the intermittent mode ranges from several Hz to 400 kHz. Moreover, since the main transistor 127 and the auxiliary transistor 129 alternately perform switching operations at the audible frequency, the inductor 131, the smoothing capacitor 133, the coupling capacitor groups 45 and 47, and the like are vibrated and the vibration is transmitted further to the main board, thus generating noise.

The noise-free mode is employed to remove or reduce the noise in the intermittent mode. The noise-free mode is an operation mode which is used in order to maintain the operating frequency at values equal to or higher than the audible frequency so as to prevent occurrence of a situation where the load becomes smaller to perform a switching operation in the intermittent mode, whereby the operating frequency becomes smaller than the upper limit of the audible frequency. For example, the operating frequency in the noise-free mode ranges from 20 kHz to 400 kHz. In the noise-free mode, the operating frequency is maintained at values higher than the audible frequency when electrical power is supplied to a small load (hereinafter, referred to as an audible frequency load) of which the operating frequency will fall within the audible frequency if operated in the intermittent mode. When electrical power is supplied to the audible frequency load, the ON periods occur before the output voltage reaches the lower limit ($V_L$).

When the main transistor 127 is changed to the ON state at that time point, the output voltage will exceed the upper limit ($V_H$) unless there is a change in the load and as long as the ON period is not decreased. In the noise-free mode the ON period is set based on the difference between the output voltage and the lower limit ($V_L$) at the start point of the ON period so as to prevent the output voltage from exceeding the upper limit ($V_H$), whereby the output voltage is maintained at a predetermined range around the setting voltage ($V_s$). Specifically, by setting the ON period so as to be shorter as the difference between the output voltage and the lower limit ($V_L$) at the start point of the ON period increases, the output voltage at the start point of the OFF period can be decreased. Therefore, it is possible to prevent the output voltage from exceeding the upper limit ($V_H$) even when the operating frequency is maintained at values equal to or higher than the audible frequency.

The FET driver 125 monitors the operating frequency which varies in accordance with the magnitude of a load to maintain the operating frequency at values equal to or higher than the audible frequency even with respect to the audible frequency load. FIG. 4(D) shows the state where the cycle corresponding to the operating frequency is fixed to Tmin, the ON period becomes shorter in the order of ton1, ton2, and ton3 as the load becomes smaller with time, and the ON period becomes longer as depicted by ton4 because the load has increased so that the output voltage at the start point of the ON period has decreased to the lower limit ($V_L$). FIG. 4(E) illustrates the change in the output voltage, corresponding to FIG. 4(D). Although in the present embodiment, the noise-free mode is configured as an independent operation mode from the intermittent mode, the noise-free mode can be also said to be a modified operation mode of the intermittent mode, modified such that the operating frequency is set to be equal to or higher than the audible frequency with respect to the audible frequency load. Therefore, when the load operates at higher operating frequencies than the audible frequency, the same control method as the intermittent mode can be employed by fixing the ON periods.

A noise-free mode embodiment of the present invention includes all control methods satisfying the requirements that the operating frequency is lower than that in the PWM mode and higher than the audible frequency; and the efficiency with respect to the audible frequency load is lower than that in the intermittent mode. For example, the cycle during which the operating frequency is maintained at values higher than the audible frequency is not necessarily fixed to the constant value Tmin. As the FET driver having the PWM mode, the intermittent mode, and the noise-free mode, existing products can be found with part number TPS51221 (Texas Instruments Inc.), part number MAX1977 (Maxim Inc.), for example. Although the current-controlled FET driver 125 has been illustrated and described, embodiments of the present invention are not limited to the current-controlled power supply unit but can be applied to a voltage-controlled power supply unit.

As described above, the FET driver 125 having three operation modes has been used to be set in either one of the intermittent mode and the noise-free mode. When the FET driver 125 is set to operate in the intermittent mode, the FET driver 125 transitions between the PWM mode and the intermittent mode in accordance with the magnitude of the load. When the FET driver 125 is set to operate in the noise-free mode, the FET driver 125 transitions between the PWM mode and the noise-free mode in accordance with the magnitude of the load. In the noise-free mode, although noise is not generated because the operating frequency is maintained at values equal to or higher than the audible frequency, the switching loss becomes higher than that in the intermittent mode, and accordingly, the efficiency with respect to the audible frequency load decreases.

On the other hand, it cannot be said that noise will always be generated even when the operating frequency falls within the audible frequency band as described above. Therefore, operation in the noise-free mode may result in an increase in the switching loss in such a state where noise will not be generated even if the operation is continued in the intermittent mode at the operating frequency of the audible frequency. Since the conventional technique was only able to select either one of the intermittent mode and the noise-free mode, there was no way but to set in the noise-free mode when noise reduction or prevention had more importance. The power supply unit 100 according to the present embodiment is initially set in the intermittent mode, and transitions from the intermittent mode to the noise-free mode in response to the High signal (switching signal) from the OR gate 123 which is supplied only when it is determined that noise is actually generated based on the detection results of the silicon microphone 101 detecting the noise level, whereby the noise-free mode is used as least as possible.

Description of Operation

Figure 5:
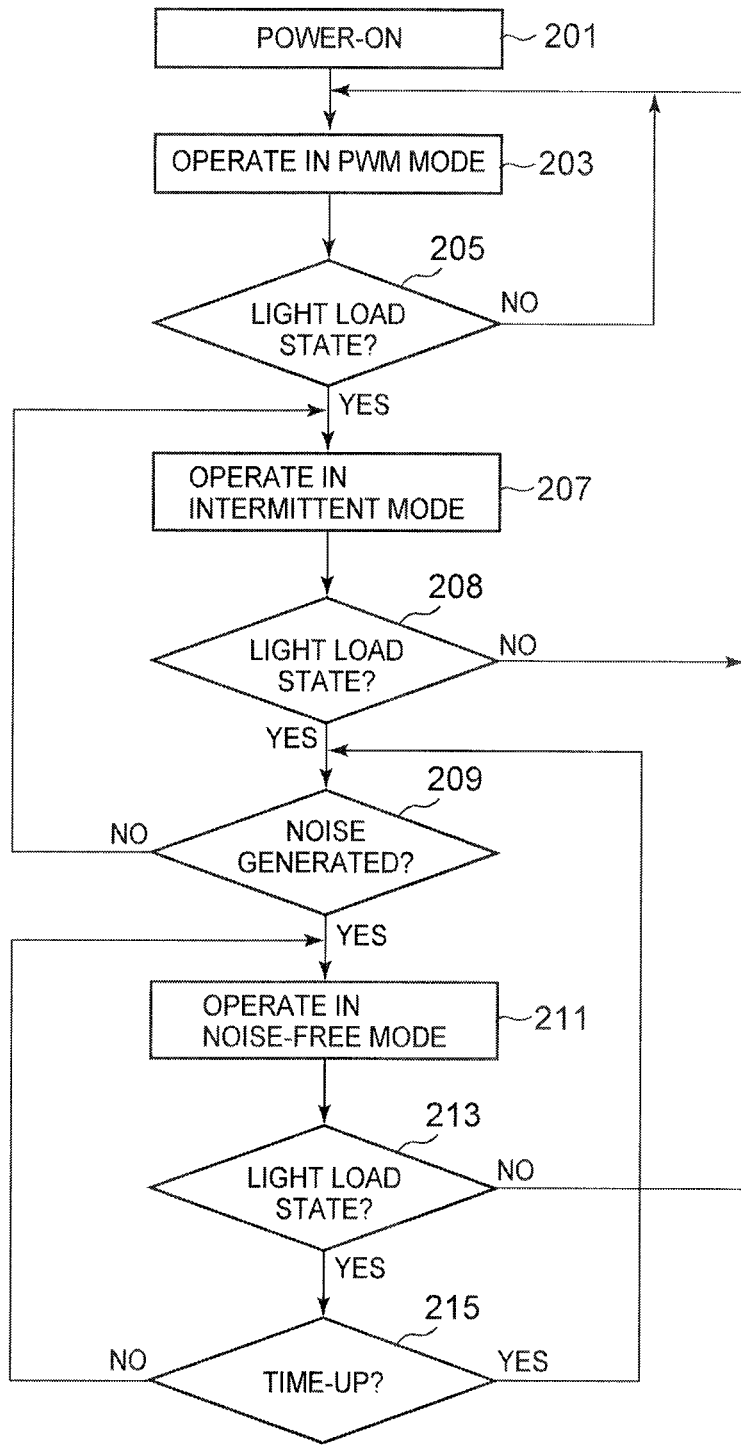
FIG. 5 is a flowchart for describing the operation of the power supply unit according to an embodiment of the invention.

Next, the description of the operation of the power supply unit 100 will be provided based on the flowchart of FIG. 5. At block 201, the laptop PC 10 is powered On. At this time, it will be supposed that noise is not generated and the OR gate 123 is not outputting the switching signal. The power controller 29 sends an activation signal to the FET driver 125 to activate its operation. Embodiments of the present invention can be applied not only to the power-ON state where electrical power is supplied to all devices, but also to states such as the suspended state where electrical power is supplied to only a portion of devices. The FET driver 125 detects the open circuit voltage of the sense resistor 135 and operates in the PWM mode as in block 203 during the power-ON state.

In the PWM mode, since the operating frequency is higher than the upper limit of the audible frequency, noise will not be generally generated. At block 205, the FET driver 125 measures the open circuit voltage of the sense resistor 135 to determine whether or not the load current is lower than the predetermined value. When the load current is higher than the predetermined value, the power consumption of the load is determined to be higher than the predetermined value, and the FET driver 125 continues operating in the PWM mode. When the laptop PC 10 transitions to the suspended state and the load of the power supply unit 100 is decreased, the load current decreases, and the FET driver 125 proceeds to block 207 and operates in the intermittent mode. At block 208, when the FET driver 125 determines that the power consumption of the load during its operation in the intermittent mode has exceeded the predetermined value, the FET driver 125 returns to block 203 and transitions to the PWM mode. When the power consumption of the load is smaller than the predetermined value, the FET driver 125 proceeds to block 209.

At block 209, the comparator 115 determines whether or not the level of the audio signal output by the silicon microphone 101 exceeds the predetermined value. Since the FET driver 125 is not operating in the noise-free mode, the time-up signal is not output from the EC 27. The output of the comparator 115 is output to the FET driver 125 via the OR gate 123. When the level of the audio signal does not exceed the predetermined value, the OR gate 123 does not output the switching signal; therefore, the FET driver 125 returns to block 207 and continues operating in the intermittent mode.

When it is determined at block 209 that the level of the audio signal has exceeded the reference voltage of the reference voltage source 117, it says that noise is actually generated; therefore, the OR gate 123 will output the switching signal to the FET driver 125. At block 211, the FET driver 125 operates in the noise-free mode in response to the switching signal. When the switching signal is output from the OR gate 123 at block 211, the switching signal will be held by the AND gate 119. Therefore, the switching signal will be held even when the level of the audio signal fluctuates and the comparator 115 outputs the Low signal. Thereafter, unless the timer of the EC 27 outputs the time-up signal at block 215, the FET driver 125 will continue operating in the noise-free mode even when the level of the audio signal has decreased to be equal to or lower than the predetermined value. The FET driver 125 starts operating in the noise-free mode and sends a start signal to the EC 27 to activate the timer.

When the load current is determined to be higher than the predetermined value at block 213, the FET driver 125 proceeds to block 203 and operates in the PWM mode. Unless the timer of the EC 27 outputs the time-up signal at block 215, the FET driver 125 will return to block 211 and operate in the noise-free mode. When the timer of the EC 27 outputs the time-up signal at block 215, the AND gate 119 will output the Low signal, and accordingly, the output of the OR gate 123 will be determined by only the output of the comparator 115. Therefore, the switching signal will disappear if the level of the audio signal decreases, whereas the switching signal will go on if the level of the audio signal does not decrease. At block 209, the FET driver 125 determines whether or not the noise level has decreases so that the switching signal has disappeared, and when the switching signal has disappeared, the FET driver 125 proceeds to block 207 and operates in the intermittent mode.

If the switching signal does not disappear because of the continuing noise, the FET driver 125 proceeds to block 211 and continues operating in the noise-free mode. When the FET driver 125 transitions to the intermittent mode, the FET driver 125 sends a timer reset signal to the EC 27. The transition from block 215 to block 209 guarantees that even when the FET driver 125 starts operating in the noise-free mode, the FET driver 125 determines whether or not noise is generated at predetermined intervals of time and operates in the intermittent mode which provided better efficiency when noise is not generated.

State Transition

Figure 6:
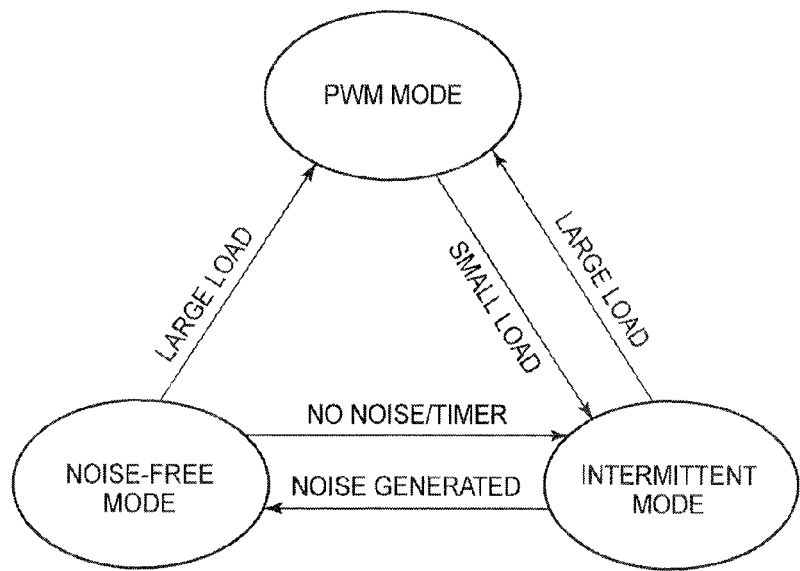
FIG. 6 is a diagram for describing the state transition of the power supply unit according to an embodiment of the invention.

FIG. 6 is a diagram for describing the state transition of the power supply unit 100. The power supply unit 100 operates in the PWM mode under the heavy load state but transitions from the PWM mode to the intermittent mode when the efficiency under the light load state becomes not ignorable. When noise is generated during its operation in the intermittent mode, the power supply unit 100 transitions to the noise-free mode. When the load becomes large during its operation in the noise-free mode, the power supply unit 100 transitions to the PWM mode. Moreover, when its operating time in the noise-free mode reaches a predetermined period of time, the noise Occurring state of the noise is checked, and the power supply unit 100 transitions to the intermittent mode when noise is not generated while maintaining the noise-free mode when noise is generated. Since the power supply unit 100 is initially set to operate in the intermittent mode, the transition from the PWM mode to the noise-free mode is not illustrated in FIG. 6.

Mounting Structure of Power Supply Unit

Figure 7:
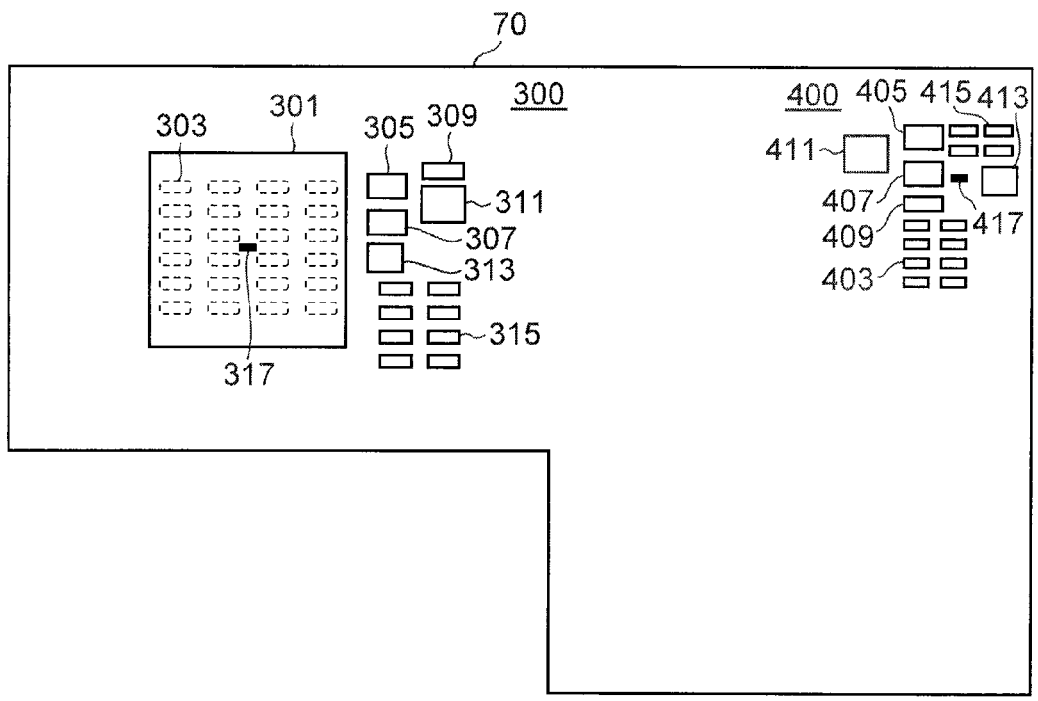
FIG. 7 is a top plan view for describing the components of the power supply unit mounted on a main board according to an embodiment of the invention.

FIG. 7 is a top plan view for describing the components of the power supply unit 100 mounted on a main board. In FIG. 7, the state is illustrated where two power supply units 300 and 400 are mounted on a main board 70. The power supply unit 300 is configured to supply electrical power exclusively to the CPU 301. The power supply unit 400 is configured to supply electrical power to other devices other than the CPU 301. The elements constituting the power supply units 300 and 400 are surface-mounted on the main board 70. The power supply units 300 and 400 are configured by input-side decoupling capacitors 303 and 403, output-side decoupling capacitors 315 and 415, main transistors 305 and 405, auxiliary transistors 307 and 407, inductors 309 and 409, FET drivers 311 and 411, audio circuits 313 and 413, and silicon microphones 317 and 417, respectively. The input-side decoupling capacitors 303 and the silicon microphone 317 are mounted on the backside of the main board 70. That is to say, the silicon microphones 317 and 417 are arranged in the vicinity of elements which often generate vibration and are thus likely to become a noise source.

The power supply unit 100 can be broadly applied to a power supply unit which has an operation mode where the efficiency with respect to the alignment film is good but the operating frequency falls within the audible frequency range and an operation mode where the efficiency with respect to the audible frequency load is poor but the operating frequency is maintained at values higher than the audible frequency. Although the power supply unit 100 has been described as a step-up switching regulator in which the output voltage becomes lower than the input voltage, embodiments of the present invention can be applied to a step-up switching regulator. Moreover, although a power supply unit in which a DC voltage is input has been described, embodiments of the present invention can be applied to a power supply unit in which an AC voltage is input. In the descriptions above, although the power supply unit 100 installed in the laptop PC 10 has been illustrated and described, the power supply unit according to an embodiment of the present invention can be broadly applied to a switching regulator which is used for apparatuses or devices needing to be used in a quiet environment or to eliminate noise, such as, for example, an audio apparatus, an electric vehicle, a hybrid car, and a video recorder.

Although the present invention has been described so far in accordance with embodiments illustrated in drawings, the invention is not limited to the embodiments illustrated in the drawings. As a matter of course, any known configurations may be used as long as the functions of the present invention are executed thereby.

The present invention can be applied to a power supply unit which is installed in an apparatus or device used in a quiet environment.

In accordance with aspects of the present invention, it is possible to provide a power supply unit capable of achieving noise reduction without decreasing efficiency under the light load state. Moreover, it is possible to provide a semiconductor chip realizing such a power supply unit. Furthermore, it is possible to provide a method for controlling a switching element of such a power supply unit. In addition, it is possible to provide a power consuming apparatus incorporating such a power supply unit.

It should be understood and appreciated that power supply units capable of achieving noise reduction, semiconductor chips realizing such power supply units, and power consuming devices incorporating such power supply units as discussed and broadly contemplated herein, can be employed in a wide variety of operating environments beyond those disclosed in embodiments discussed herein. Thus, while the foregoing discussion presents a laptop PC as a possible operating environment for such power supply units, semiconductor chips realizing such power supply units, and power consuming devices incorporating such power supply units according to embodiments of the invention, it of course should be understood that this is provided by way of a non-limiting example. Power supply units have multiple applications and operational requirement necessary to the function of a vast number electronic devices.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
a switching element configured to perform a switching operation between power modes;
a microphone configured to collect system vibration noise to output an audio signal;
an audio circuit configured to output a switching signal when the level of the audio signal exceeds a predetermined value; and
a control circuit configured to, responsive to receiving the switching to signal, control the switching element in one of a Pulse Width Modulation mode, an intermittent mode, and a noise-free mode;
wherein the control circuit transitions to the noise-free mode in response to the switching signal received during operation in the intermittent mode.

2. The apparatus according to claim 1, further comprising a timer circuit that is connected to the control circuit and configured to measure the time elapsed after the control circuit transitions to the noise-free mode; and
wherein the control circuit transitions to the intermittent mode in response to a time-up signal received from the timer circuit during its operation in the noise-free mode.

3. The apparatus according to claim 2, wherein the microphone comprises a silicon microphone positioned to sense vibration in the system at an audible frequency.

4. The apparatus according to claim 1, further comprising a current measurement circuit that is connected to the control circuit and configured to measure a load current.

5. The apparatus according to claim 4, wherein the control circuit transitions to the intermittent mode when the load current has become lower than a predetermined value during its operation in the Pulse Width Modulation mode.

6. The apparatus according to claim 4, wherein the control circuit transitions to the Pulse Width Modulation mode when the load current has become higher than a predetermined value.

7. The apparatus according to claim 1, wherein a decoupling capacitor is connected to the power supply unit; and, wherein the microphone is arranged in the vicinity of the decoupling capacitor.

8. A method comprising:
receiving an audio signal from a microphone configured to collect system vibration noise;
receiving a load current signal;
receiving a time-up signal; and
switching an electronic device to one of a plurality of power modes via a switching element responsive to the audio signal and one or more of the load current signal and the time-up signal;
said plurality of power modes comprising:
a Pulse Width Modulation mode, an intermittent mode, and a noise-free mode.

9. The method according to claim 8, wherein the switching an electronic device to one of a plurality of power modes comprises switching the electronic device to one or more of the Pulse Width Modulation mode and the noise-free mode responsive to one or more of the audio signal exceeding a predetermined threshold and the load current signal exceeding a predetermined threshold.

10. The method according to claim 8, wherein the switching an electronic device to one of a plurality of power modes comprises switching the electronic device to the noise-free mode responsive to the audio signal exceeding a predetermined threshold.

11. The method according to claim 8, wherein the switching an electronic device to one of a plurality of power modes comprises switching the electronic device to the Pulse Width Modulation mode responsive to one or more of the load current signal exceeding a predetermined threshold.

12. The method according to claim 8, wherein the switching an electronic device to one of a plurality of power modes comprises switching the electronic device to the intermittent mode responsive the time-up signal being received while operating the electronic device in the noise-free mode.

13. The method according to claim 8, wherein the switching an electronic device to one of a plurality of power modes comprises switching the electronic device to the intermittent mode when the load current has become lower than a predetermined value during operation in the Pulse Width Modulation mode.

14. The method according to claim 8, wherein the switching an electronic device to one of a plurality of power modes comprises switching the electronic device to the Pulse Width Modulation mode when the load current has become higher than a predetermined value while operating in the intermittent mode.

15. A computer program product comprising:
a program of instructions tangibly embodied on a non-transient program storage device, the program of instructions comprising:
computer readable program code configured to:
receive an audio signal from a microphone configured to collect system vibration noise;
receive a load current signal;
receive a time-up signal; and
switch an electronic device to one of a plurality of power modes responsive to the audio signal and one or more of the load current signal and the time-up signal;
said plurality of power modes comprising:
a Pulse Width Modulation mode, an intermittent mode, and a noise-free mode.

16. The computer program product according to claim 15, wherein to switch an electronic device to one of a plurality of power modes comprises switching the electronic device to one or more of the Pulse Width Modulation mode and the noise-free mode responsive to one or more of the audio signal exceeding a predetermined threshold and the load current signal exceeding a predetermined threshold.

17. The computer program product according to claim 15, wherein to switch an electronic device to one of a plurality of power modes comprises switching the electronic device to the noise-free mode responsive to the audio signal exceeding a predetermined threshold.

18. The computer program product according to claim 15, wherein to switch an electronic device to one of a plurality of power modes comprises switching the electronic device to the noise-free mode responsive to the audio signal exceeding a predetermined threshold.

19. The computer program product according to claim 15, wherein to switch an electronic device to one of a plurality of power modes comprises switching the electronic device to the Pulse Width Modulation mode responsive to one or more of the load current signal exceeding a predetermined threshold.

20. The computer program product according to claim 15, wherein to switch an electronic device to one of a plurality of power modes comprises switching the electronic device to the intermittent mode responsive the time-up signal being received while operating the electronic device in the noise-free mode.

* * * * *